United States Patent
Hembree et al.

(10) Patent No.: US 6,851,597 B2
(45) Date of Patent: Feb. 8, 2005

(54) UTILIZE ULTRASONIC ENERGY TO REDUCE THE INITIAL CONTACT FORCES IN KNOWN-GOOD-DIE OR PERMANENT CONTACT SYSTEMS

(75) Inventors: David R. Hembree, Boise, ID (US); Michael E. Hess, Kuna, ID (US); John O. Jacobson, Boise, ID (US); Warren M. Farnworth, Nampa, ID (US); Alan G. Wood, Boise, ID (US)

(73) Assignee: Micron Technology, Inc., Boise, ID (US)

( * ) Notice: Subject to any disclaimer, the term of this patent is extended or adjusted under 35 U.S.C. 154(b) by 68 days.

(21) Appl. No.: 10/213,128

(22) Filed: Aug. 5, 2002

(65) Prior Publication Data

US 2003/0057260 A1 Mar. 27, 2003

Related U.S. Application Data

(63) Continuation of application No. 09/921,622, filed on Aug. 3, 2001, now Pat. No. 6,427,899, which is a division of application No. 09/416,248, filed on Oct. 12, 1999, now Pat. No. 6,296,171, which is a continuation of application No. 09/027,690, filed on Feb. 23, 1998, now Pat. No. 6,045,026.

(51) Int. Cl.[7] ............................ B23K 20/10; B23K 31/02
(52) U.S. Cl. ........................ 228/110.1; 228/1.1; 228/103
(58) Field of Search .......................... 228/103, 110.1, 228/1.1, 173.3, 44.7, 179.1, 6.2, 180.1; 156/73.1, 73.2

(56) References Cited

U.S. PATENT DOCUMENTS

| | | | |
|---|---|---|---|
| 3,563,443 A | 2/1971 | Pedrotti et al. | |
| 3,670,394 A | 6/1972 | Daniels et al. | |
| 3,697,873 A | 10/1972 | Mazur | |
| 3,863,826 A | 2/1975 | Shoh | |
| 3,938,722 A | 2/1976 | Kelly et al. | |
| 4,444,349 A | 4/1984 | Bilane et al. | |
| 4,475,681 A | 10/1984 | Ingle | |
| 4,513,190 A | 4/1985 | Ellet et al. | |
| 4,757,933 A | 7/1988 | Hawkins et al. | |
| 5,115,961 A | 5/1992 | Nakajima | |
| 5,197,371 A | 3/1993 | Van Der Heijden et al. | |
| 5,326,428 A | 7/1994 | Farnworth et al. | |
| 5,406,210 A | 4/1995 | Pedder | |
| 5,451,165 A | 9/1995 | Cearley-Cabbiness et al. | |
| 5,469,072 A | 11/1995 | Williams et al. | |
| 5,478,779 A | 12/1995 | Akram | |
| 5,483,741 A | 1/1996 | Akram et al. | |
| 5,494,207 A | 2/1996 | Asanasavest | |
| 5,506,514 A | 4/1996 | Difrancesco | |
| 5,517,752 A | 5/1996 | Sakata et al. | |
| 5,572,140 A | 11/1996 | Lim et al. | |
| 5,603,444 A | 2/1997 | Sato | |
| 5,607,096 A | 3/1997 | Asanasavest | |
| 5,611,478 A | 3/1997 | Asanasavest | |

(List continued on next page.)

OTHER PUBLICATIONS

U. S. patent application Publication No. US 2001/0045446 A1, published Nov. 29, 2001.
U. S. patent application Publication No. US 2001/0048018 A1, published Dec. 6, 2001.

*Primary Examiner*—Kiley Stoner
(74) *Attorney, Agent, or Firm*—TraskBritt

(57) ABSTRACT

A machine and method for bonding puncture-type conductive contact members of an interconnect to the bond pads of a bare semiconductor die includes the use of one or two ultrasonic vibrators mounted to vibrate one or both of the die and interconnect. A short axial linear burst of ultrasonic energy enables the contact members to pierce hard oxide layers on the surfaces of the bond pads at a much lower compressive force and rapidly achieve full penetration depth.

20 Claims, 4 Drawing Sheets

U.S. PATENT DOCUMENTS

| | | |
|---|---|---|
| 5,655,700 A | 8/1997 | Pham et al. |
| 5,676,304 A | 10/1997 | Matsui et al. |
| 6,045,026 A | 4/2000 | Hembree et al. |
| 6,296,171 B1 | 10/2001 | Hembree et al. |
| 6,419,143 B2 | 7/2002 | Hembree et al. |
| 6,427,899 B2 | 8/2002 | Hembree et al. |
| 2001/0048018 A1 * | 12/2001 | Hembree et al. |
| 2002/1079681 * | 12/2002 | Hembree et al. |
| 2003/0057260 A1 * | 3/2003 | Hembree et al. |

* cited by examiner

UTILIZE ULTRASONIC ENERGY TO REDUCE THE INITIAL CONTACT FORCES IN KNOWN-GOOD-DIE OR PERMANENT CONTACT SYSTEMS

CROSS-REFERENCE TO RELATED APPLICATIONS

This application is a continuation of application Ser. No. 09/921,622, filed Aug. 3, 2001, now U.S. Pat. No. 6,427,899, issued Aug. 6, 2002, which is a divisional of application Ser. No. 09/416,248, filed Oct. 12, 1999, now U.S. Pat. No. 6,296,171 B1, issued Oct. 2, 2001, which is a continuation of application Ser. No. 09/027,690, filed Feb. 23, 1998, now U.S. Pat. No. 6,045,026, issued Apr. 4, 2000.

BACKGROUND OF THE INVENTION

1. Field of the Invention

This invention relates generally to electrical connections to semiconductor devices. More particularly, the invention pertains to methods and apparatus for making nonpermanent and permanent low resistance interconnections between a semiconductor device (die) and a substrate.

2. State of the Art

As the densities of input/output (I/O) wire bond pads increase on semiconductor devices, testing of the devices becomes more difficult. The function of any interconnect system, whether a probe card, test socket, or burn-in socket, is to provide a reliable interconnect between the integrated circuit tester and the individual semiconductor device. The reliable burn-in and testing of bare dice is required to provide known-good-die (KGD) for incorporation into multi-chip assemblies, for example. The KGD testing of dice and wafers is dependent upon uniformly achieving consistent electric connections between the test apparatus and the semiconductor device substrate.

Prior art contact members for testing dice are generally of four forms. In one form, the contact members simply abut the bond pads or leads and the two are pressed together to make the desired electrical contact. Examples of this type of interconnection are described in U.S. Pat. No. 5,406,210 of Pedder, U.S. Pat. No. 5,572,140 of Lim et al., U.S. Pat. No. 5,469,072 of Williams et al. and U.S. Pat. No. 5,451,165 of Cearley-Cabbiness et al.

A problem with such connections is that bond pads are typically covered with a layer of metal oxides or silicon dioxide which insulates the pads and makes simple contact ineffective as a reliable electrical connection. In some cases, differential thermal expansion of the contact member may cause lateral movement which tears the bond pad.

In a second configuration, contact members may be formed to make a "wiping action" contact with the bond pads. Examples of such are various sockets, pins, plugs, etc. Again, as is well known in the industry, pre-existent oxides and subsequently-formed oxides on the metal surfaces result in defective electrical contact.

In a third form of making temporary contact between a test device and a die, the contact members are non-permanently bonded to the pads on the dice by a solder or other conductive bonding material. Illustrative of this configuration is the disclosure of U.S. Pat. No. 5,517,752 of Sakata et al. Removal of the solder (by remelting) is required to disconnect the contact members from the dice after testing is completed.

The use of solder reflow technology for temporary bonds has many disadvantages including the following. First, surface preparation with highly corrosive and environmentally hazardous fluxes is required. Second, solder bonds are occasionally defective, requiring testing of each bond and reworking if necessary. Third, solder reflow requires several additional processing steps and apparatus, adding to the manufacturing expense. Fourth, the temperatures required for reworking as well as disconnect melting place additional stresses on the device.

A fourth form of contact member is configured to puncture a bond pad, passing through an oxide layer into the underlying metal for low-resistant electrical contact. An example of this configuration is shown in U.S. Pat. No. 5,506,514 of Difrancesco, incorporated by reference herein.

One preferred form of a puncturing contact member is described in U.S. Pat. No. 5,326,428 of Farnworth et al., U.S. Pat. No. 5,478,779 of Akram, and U.S. Pat. No. 5,483,741 of Akram et al., all of which are incorporated by reference herein. In this configuration, the interconnect has a non-conductive or semiconductive substrate upon which raised contact members include sharp projections for puncturing the metal oxide coating on the bond pads and retaining non-permanent, low-resistance electrical continuity with the underlying metal. A compressive force is maintained during the time the die or dice are undergoing testing. The sharp projections may be formed to limit the penetration distance.

Generally, the metal oxide layer overlying the metal is much harder than the metal. Thus, the force required to penetrate and pass through the oxide layer is considerably greater than the forces required to penetrate the metal.

The compressive force exerted on the interconnect and the semiconductor die may be controlled by (a) controlling the rate of movement toward each other, or (b) controlling the compressive force itself, such as with a spring or other such device. In either case, the initially high resistance requiring a high compressive force to penetrate the oxide layer is suddenly released upon penetration. However, the compressive force may not be reduced quickly enough to avoid "over-penetration" of the underlying metal. Furthermore, even small differences in the thickness of the oxide layer will result in oxide penetration at different compression levels. The required compressive force to achieve oxide penetration of all bond pads will vary from die to die, further exacerbating the problem. Such is particularly a problem where the die has a large number of bond pads thereon and the compressive force required to penetrate any oxide coating on the bond pads is larger than that capable of being transmitted through the head of the transfer apparatus.

As is well known in the art, ultrasonic vibration has been used to join bond pads and leads with thin wires. U.S. Pat. Nos. 5,494,207 and 5,607,096 of Asanasavest and U.S. Pat. No. 4,475,681 of Ingle teach particular ultrasonic wire bonding apparatus and methods. Ultrasonic vibration may be combined with heating as in the "thermosonic" wire bonding process. U.S. Pat. No. 3,697,873 of Mazur describes a method for ultrasonically soldering contacts and indicates that "the ultrasonic wave energy acts to break up oxides on the surface of the semiconductor body . . . "

U.S. Pat. No. 3,938,722 of Kelly et al. discloses an apparatus using ultrasonic energy for forming bonds between beam leads and conductive surfaces such as on a substrate.

SUMMARY OF THE INVENTION

The invention comprises an apparatus and method for reducing the compressive force required to achieve the desired initial penetration of a bond pad by a contact member, such as used in a die burn-in and testing carrier. The high initial force required in the prior art to break through the "crust" of hard oxide on the surface of the metal pad is much reduced. Penetration of the hard oxide layer ordinarily results in a sudden "rebound" of accelerated movement due to reduced resistance, and the contact member may overpenetrate the bond pad. However, with this invention, the rebound is minimized, if not eliminated.

The maximum compressive force required to achieve the final desired penetration of the bond pad is also reduced, while ensuring that all of the bond pads on a bare die are fully penetrated to provide uniformly low resistivity interconnections.

In the invention, ultrasonic vibration is applied to either one or both of the bare die and the corresponding interconnect contact member. The vibratory movement is generated in a direction generally perpendicular to the die surface by a transducer including e.g. a piezoelectric element. This direction of vibratory movement is known herein as the "axial" direction.

The frequency and amplitude of the vibratory forces are controlled such that the interconnect contact member pierces the hard oxide layer on the bond pad very rapidly and at lower applied compression forces. The ultrasonic vibration also ensures that all bond pads are fully penetrated to achieve low-resistivity connections.

The bonding system of the invention permits the use of low bonding compressional forces together with generally unidirectional ultrasonic vibrational energy and a frequency modulated controlled resonance to produce uniformly reliable simultaneous connection of all bonds on a die without heat or with minimal heating.

BRIEF DESCRIPTION OF THE SEVERAL VIEWS OF THE DRAWINGS

The invention is illustrated in the following figures, wherein the elements are not shown to scale.

DETAILED DESCRIPTION OF THE INVENTION

An improvement in forming a non-permanent or permanent low-resistivity electrical connection between a penetration-type raised contact member and a conductive bond pad of a bare die is described herein. The invention is particularly applicable to systems for testing bare dice to be referred to as known-good-dies (KGD), where the testing interconnect is re-used many times.

The invention is described herein in relation to a testing apparatus or assembler whereby one or more bare dice (singulated or in a wafer form) are non-permanently interconnected with a test device, but the invention may be used for making other temporary or permanent electrical connections between a bare die and a substrate with any desired type contact member or a puncture-type contact member.

Figure 1:
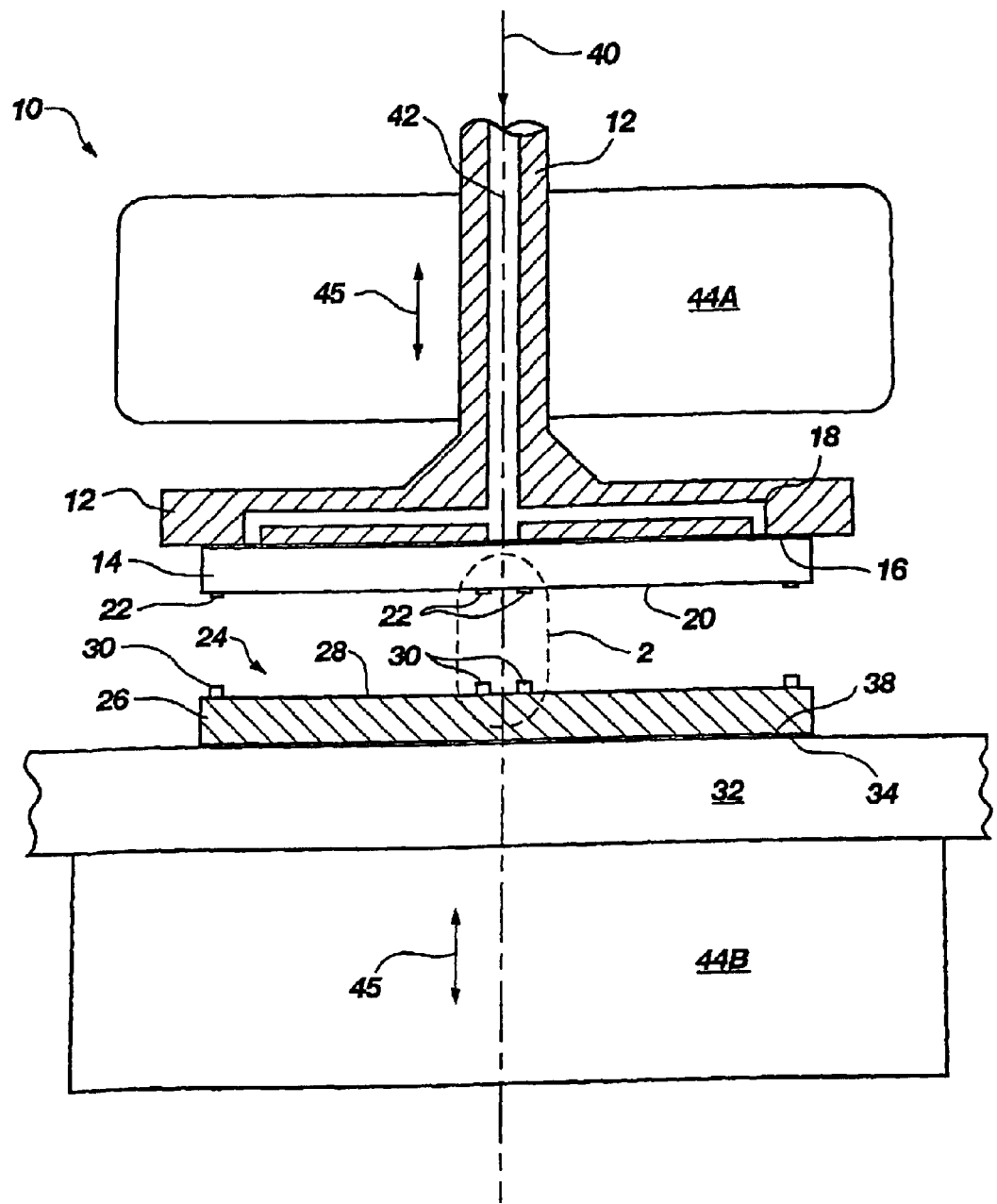
FIG. 1 is a cross-sectional end view of a bonding apparatus of the invention in an assembler machine.

As depicted in FIG. 1, an assembler machine 10 is shown in part and includes a die mount or quill 12 to which a bare die 14 is secured on its back side 16 by a vacuum formed through apertures 18 of the quill 12. The vacuum may be applied either through one aperture 18, a plurality of apertures 18, a quill 12 having a metallic tip, a quill 12 having a resilient tip, or variations thereof. The active surface 20 of the die 14 is shown with a plurality of bond pads 22 for connection to useful electronic circuits, as known in the art. Facing the active surface 20 of the die 14 is an exemplary interconnect 24 including a substrate 26 having a connection surface 28 with a plurality of raised contact members 30. The contact members 30 are located on the connection surface 28 for accurate contact with corresponding bond pads 22 on the active surface 20.

The interconnect 24 is here exemplified as a die tester, i.e. a die carrier used for burn-in and testing of dice for KGD purposes or a "probe card" used for testing purposes, having its rear side 38 mounted on a support member 32 by any suitable means 34 extending between the interconnect 24 and the support member 32. Alternative methods of mounting the interconnect 24 and/or die 14 include mechanical retaining members and the like as known in the art.

The quill 12 supports the die 14 and may be lowered in axial direction 40, i.e. parallel to centerline 42, whereby the die and interconnect 24 meet and are electrically joined by a controlled compressive force in direction 40. The term "interconnect 24" is used herein as being a generic term for any device having contact members 30 which are simultaneously connected to the bond pads 22 of a die 14. The machine 10 may include means for controlling the positions of the die 14 and interconnect 24 by optical, optical-mechanical or other methods for vertical alignment and parallelism.

One or more ultrasonic vibration generators or transducers 44 are mounted to vibrate the die 14 and/or interconnect 24 in an axial direction 45, i.e. parallel to centerline 42. FIG. 1 shows a first ultrasonic vibration generator 44A surrounding and attached to the quill 12. The generator 44A is controllable to axially vibrate the quill 12 and attached die 14.

Also shown is a second ultrasonic vibration generator or transducer 44B underlying support member 32 and controllable to axially vibrate the support member 32 and attached interconnect 24. The support member 32 is constructed of a material such as metal, e.g. stainless steel, which will transmit the ultrasonic vibrational movement with minimal losses in force, linearity or amplitude.

The second ultrasonic vibration generator 44B may alternatively be positioned above the support member 32, i.e. adjacent the interconnect 24.

The produced vibratory motion is generally a sinusoidal function of time. The generators or transducers 44A and 44B may be separately controlled to produce differing frequencies and motion amplitudes which in combination achieve rapid linear axial piercing of the oxide layer 54 (FIG. 2) and penetration of the underlying metal 58, and good low-resistivity adhesion of the contact member 30 with the metal, without causing damage to any of the bond pads 22 which requires repair.

Where two generators 44A, 44B are used for vibrating the die 14 and interconnect 24, respectively, it is preferred that they be about 90–180 degrees out of synchronization, so that the motions of the die and interconnect are opposed, i.e. alternately toward each other and away from each other during a fraction of the sinusoidal curves. When 180 degrees out of synchrony, the amplitude setting of both transducers may be minimized.

In another feature, the amplitudes of the two generators 44A, 44B are set to differ such that overlapping amplitude portions result in vibratory contact of the contact members 30 with the bond pads 22, even though the vibrators are in synchronization or minimally out of synchronization.

The generators 44A and/or 44B may be, for example, 25 watt generators of about 20–60 KHz frequency, and may be adjustable for F.M. (frequency modulation). Where a single generator 44A or 44B is utilized, the transmitted power controlling the vibrational amplitude is set to a value whereby the vibrational amplitude may typically be about 5–30 percent of the desired full penetration depth. Where two generators 44A and 44B are used to vibrate both the die 14 and interconnect 24, the amplitude setpoint of each may be reduced somewhat so that the net maximum amplitude is not excessive. Likewise, the vibratory forces transmitted to each of the die 14 and interconnect 24 may be reduced to prevent excessive forces acting on the bond pads 22 by the contact members 30. The optimal power requirement will vary, depending upon the total number of connections to be made, as well as other factors, described infra.

Non-axial and non-linear vibrations of the die 14 and interconnect 24 are largely avoided by promoting axial vibrations only, in order to prevent any tearing of the bond pads 22. Any tendency to produce non-linear or non-axial vibration may be further reduced by relatively rigid lateral support of the die 14 and interconnect 24, or by other means known in the art. A known ultrasonic generator has a feedback arrangement which reduces non-linearity.

The time required to achieve full penetration of all bond pads 22 is of very short duration, typically of the order of a few milliseconds, e.g. about 5 milliseconds, up to about 200 milliseconds or more, depending upon the design, numbers, sizes and material of contact members 30 and bond pads 22. The ultrasonic vibration force(s) and amplitude will also affect the required time of ultrasonic vibration.

Figure 2:
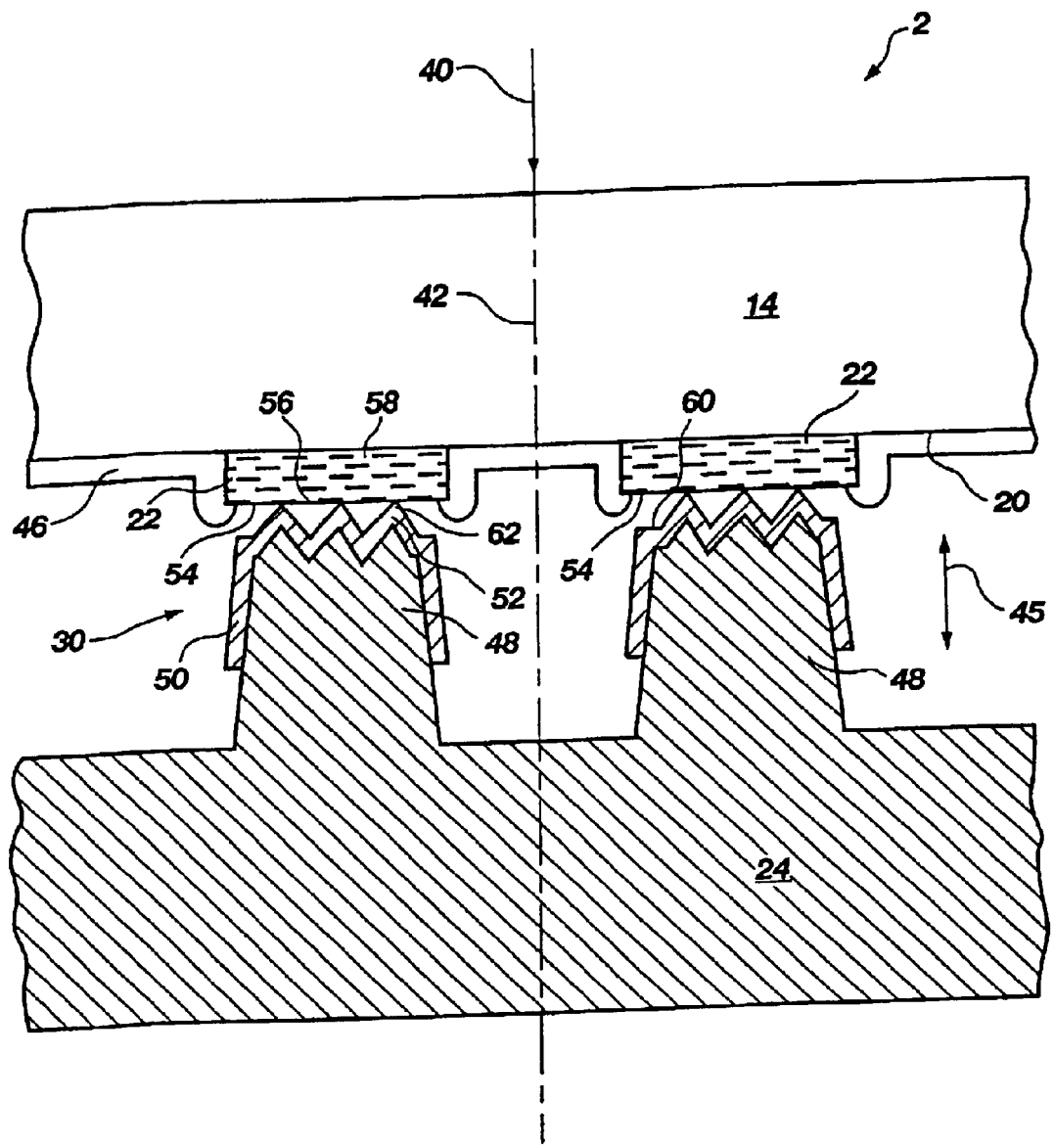
FIG. 2 is an enlarged cross-sectional view of contact members of a semiconductor device and an interconnect test apparatus prior to bonding of the contact members with the method and apparatus of the invention, as found within area 2 of FIG. 1.

We turn now to FIG. 2, which is an enlarged view of portion 2 of FIG. 1. Semiconductor die 14 is shown with active surface 20. Bond pads 22 are shown mounted on the active surface 20, and the remainder of the active surface 20 is shown covered with a passivation layer 46.

For purposes of illustration, raised interconnect contact members 30 described in U.S. Pat. Nos. 5,326,428, 5,478, 779 and 5,483,741 are used in FIGS. 2 and 3 as exemplary puncture-type contact members to which the invention is applied. In this embodiment, the contact members 30 comprise raised pillars 48 having conductive caps 50 with sharp apexes 52 for piercing a hard oxide layer 54 on a bond pad surface 56 and penetrating the underlying conductive metal 58. The design of the apexes 52 results in increasing resistance to penetration as the penetration proceeds. Although each cap 50 may include a flat penetration stop surface 60 to limit penetration, over-penetration may yet occur under circumstances of excessive force or misalignment.

At full penetration, the apexes 52 are typically retained by the metal 58 of the bond pad 22 to a degree which permits permanent use of the interconnect-die combination. Normally, however, the interconnect is a part of a ceramic die carrier for testing an individual die, such as in KGD tests, and only temporary use is made of the connections described herein.

Figure 3:
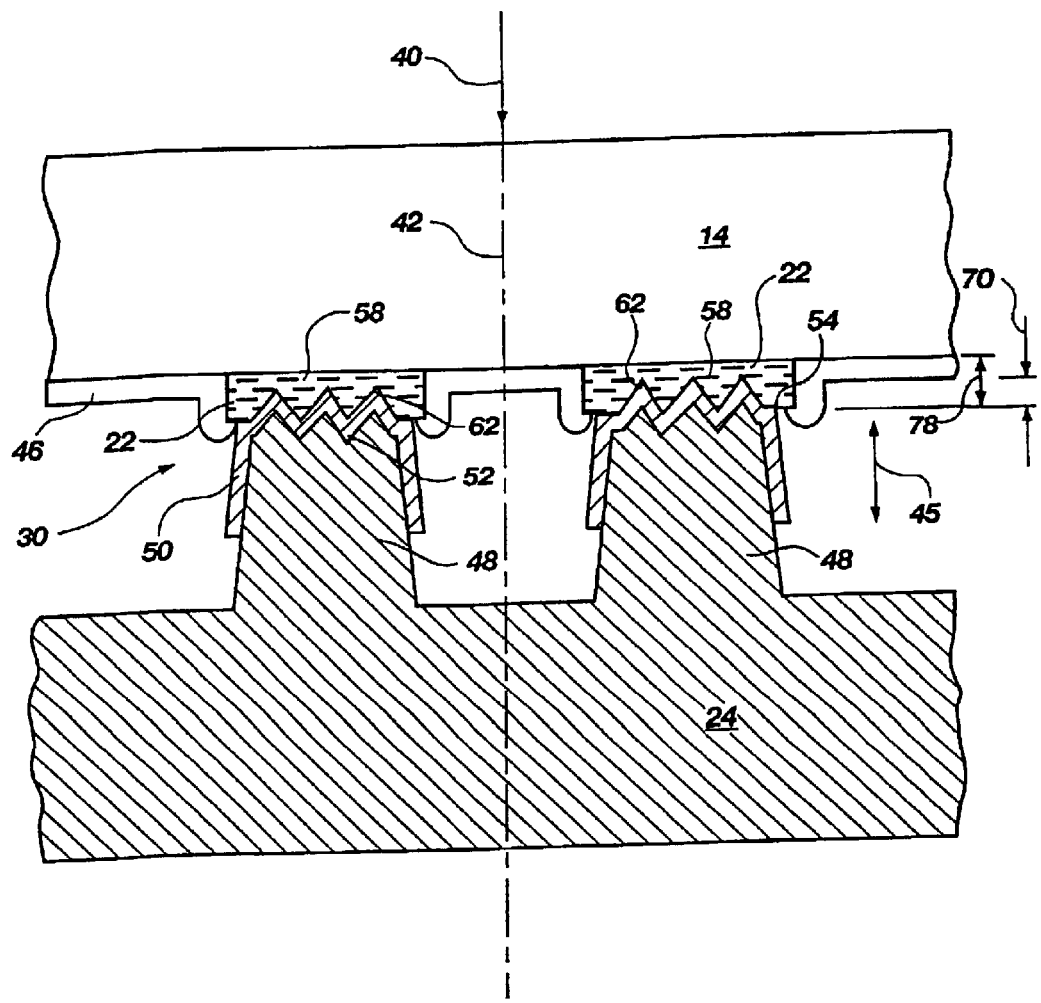
FIG. 3 is an enlarged cross-sectional view of contact members of a semiconductor device and an interconnect test apparatus following bonding of the contact members with the method and apparatus of the invention.

As taught in the patents cited above, the interconnect 24 includes conductive traces, not visible in FIGS. 2 and 3, from each contact member 30 to a test circuit or other circuit.

Figure 4:
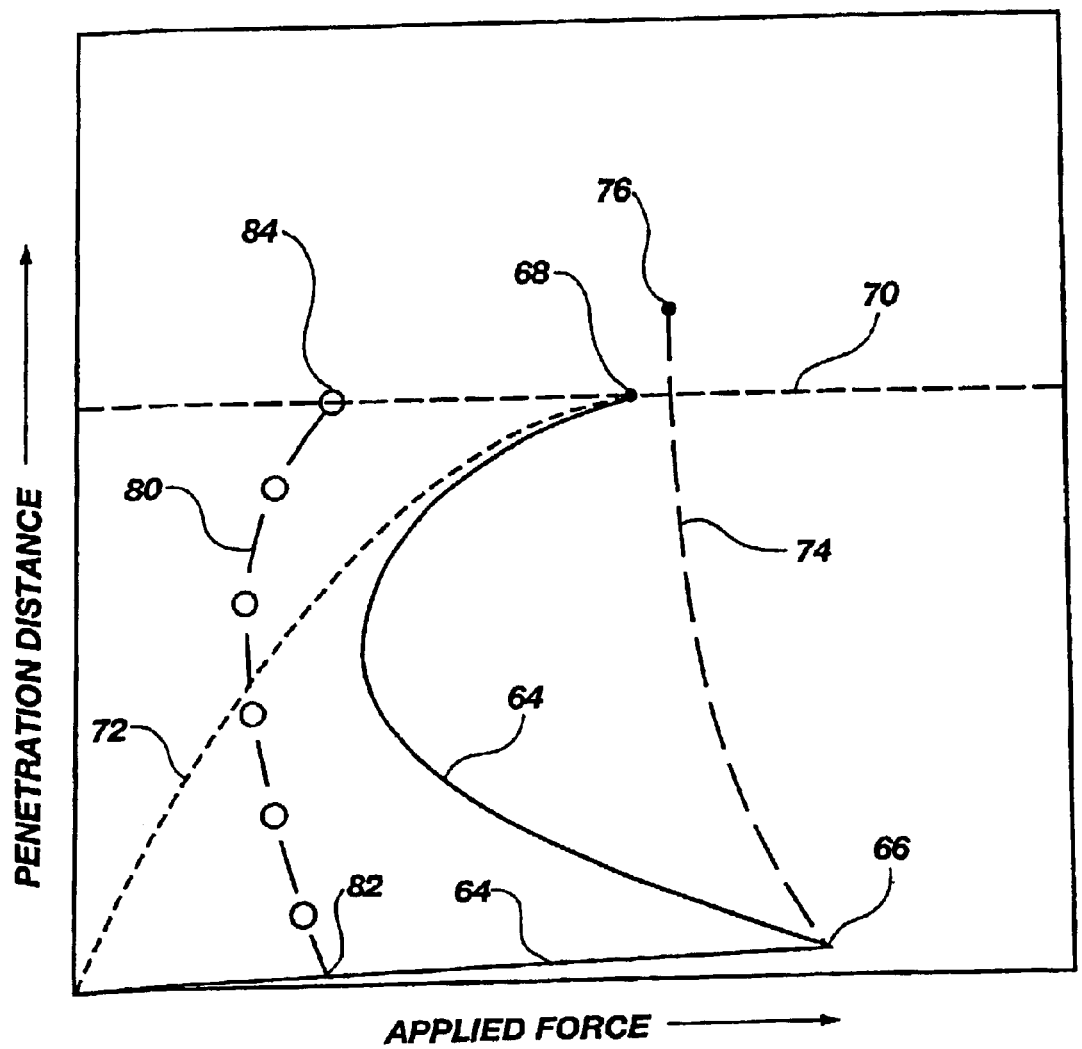
FIG. 4 is a generalized graphical depiction of the bond pad penetration as a function of applied force with and without the ultrasonic vibration of the invention.

In FIG. 2, the tips 62 of the sharp apexes 52 are shown as just touching the oxide layer 54 on each bond pad surface 56. In the prior method of forming an electrical connection, the die 14 was subsequently compressed downwardly in direction 40 until the tips 62 pierced the hard oxide layer 54 and then penetrated the softer metal 58 to approximately the desired penetration depth. A typical force-penetration curve 64 for the prior method is shown in FIG. 4. In the prior art method, the exerted compressive force was initially increased to an oxide piercing value 66, at which point the resistance suddenly decreased, enabling a decreasingly rapid penetration. The compressive force then increased until the desired "full penetration" depth 70 was attained at force value 68.

Depending upon the configuration of the system, the prior art force-penetration curve may be more like that of curve 74, i.e. where penetration occurs more rapidly than force reduction. As shown, the momentum of the contact member 30 may carry it to an excessive penetration value 76.

It should be noted that in FIG. 4, curve 72 denotes a theoretical force-penetration relationship where there is no hard oxide layer 54 on the bond pad 22, and penetration is through the metal only.

In the method of the invention, either or both of the die 14 and interconnect 24 are vibrated by an ultrasonic generator 44 in axial direction 45 (FIG. 2). The ultrasonic generators are configured to avoid or greatly minimize the production of non-axial forces which may be detrimental to the bond pads 22. For example, piezoelectric based ultrasonic generators exist which have feedback sensors for non-linearity compensation.

FIG. 3 shows a bare die 14 and an interconnect 24 wherein raised contact members 30 on the interconnect are joined to bond pads 22 of the die. The tips 62 of the apexes 52 of the contact members 30 have pierced the oxide layer 54 and penetrated the metal 58 of the bond pads 22 to a "full penetration depth" 70. The full penetration depth 70 is less than the bond pad thickness 78.

The method of simultaneously forming effective bonds between a bare die 14 with bond pads 22 and an interconnect 24 with raised contact members 30 is as follows:

(a) the die 14 and interconnect 24 are mounted in alignment in an assembler or similar machine 10 designed to simultaneously connect the plurality of corresponding contact members and bond pads with a combination of simple compression and ultrasonic vibration;

(b) the active surface 20 of the die 14 and the connection surface 28 of the interconnect 24 are brought together whereby each contact member 30 is aligned with a corresponding bond pad 22 for accurate connection;

(c) while compressing the die 14 and interconnect 24 together at a relatively low force, the die and/or interconnect is/are ultrasonically vibrated with a short burst of generally linear, axially-directed vibrational energy to cause the tips 62 of the apexes 52 of the interconnect to pierce the oxide layer 54 on the bond pads 22 and penetrate the underlying metal 58 to the desired full penetration depth 70.

If the purpose of joining the die 14 and interconnect 24 is to perform a brief test, the compression force (but not the ultrasonic vibration) may be continued until the test is complete. The die 14 and interconnect 24 may then be pulled apart, either with or without the application of ultrasonic energy. In general, however, the bonding resulting from the invention is adequate to permit withdrawal of compressive forces during testing and to produce bonds capable of permanence.

Turning again to FIG. 4, force-penetration curve 80 represents the effect of using ultrasonic force to pierce the oxide layer 54 at a much reduced applied force 82 (as compared to force 66). Ultrasonic vibration continued through the metal penetration portion of the curve 80 significantly reduces the compressive forces required for full penetration. Thus, curve 80 is seen to be at a much lower level of compression force than curves 64 and 74 of the prior art. Full penetration is achieved at the compression force level 84.

The invention has been illustrated herein using an interconnect 24 of a particular configuration. However, the invention is applicable to an interconnect with any puncture-type raised contact member. The term "interconnect" encompasses any substrate with such contact members formed thereon, and may include test probes, interposers, etc.

The benefits of the invention include a lower tendency toward tearing of the bond pads 22, very rapid bonding of all pads 22, and greater reliability of the bonding. It is believed that the method reduces the possibility of damage to the piercing members, e.g. apexes 52, of the contact members, thereby permitting greater repeated use of the interconnect 24.

It is apparent to those skilled in the art that various changes, additions and modifications may be made in the improved die-substrate interconnection method and apparatus as disclosed herein without departing from the spirit and scope of the invention as defined in the following claims.

What is claimed is:

1. A method for forming a connection comprising:
   providing a semiconductor die having a bond pad on a surface thereof;
   providing an intercomiect having a contact member on a connection surface thereof, said contact member for penetrating a layer of material on an outer surface of said bond pad for connecting said contact member to said bond pad of said semiconductor die;
   bringing together said surface of said semiconductor die and said connection surface of said interconnect having said contact member aligned proximate said bond pad on said surface of said semiconductor die;
   engaging said semiconductor die and said interconnect using a force; and
   substantially ultrasonically vibrating one of said semiconductor die and said interconnect using vibrational energy having said contact member of said interconnect penetrating a portion of said bond pad of said semiconductor die, forming an electrical connection.

2. The method of claim 1, whereby said engaging and said substantially ultrasonically vibrating are continued having said contact member penetrating said portion of said bond pad to a predetermined depth.

3. The method of claim 2, wherein said predetermined depth comprises a range of about 0.3–0.8 of a thickness of said bond pad.

4. The method of claim 2, wherein said substantially ultrasonically vibrating is conducted to achieve a vibrational amplitude in a range of about 5 to about 30 percent of said predetermined depth.

5. The method of claim 1, wherein said substantially ultrasonically vibrating is conducted in a range of about 5 to about 200 milliseconds.

6. The method of claim 2, further comprising:
   detecting penetration of said bond pad to said predetermined depth by detection/feedback apparatus.

7. The method of claim 6, further comprising:
   terminating said penetration of said bond pad on said surface of said semiconductor die by detecting said penetration of said bond pad to said predetermined depth by said detection/feedback apparatus.

8. The method of claim 1, wherein said electrical connection comprises a non-permanent electrical connection between said bond pad and said contact member.

9. The method of claim 1, wherein said electrical connection comprises a permanent electrical connection between said bond pad and said contact member.

10. The method of claim 1, further comprising:
    retracting said semiconductor die and said interconnect from each other during application of a linear axial ultrasonic vibrational force to one of said semiconductor die and said interconnect, said retracting for disconnecting said semiconductor die from said interconnect.

11. A method for forming connections comprising:
    providing a semiconductor die having a bond pad on a surface thereof;
    providing an interconnect having a contact member on a connection surface thereof, said contact member for penetrating a layer of material on an outer surface of said bond pad for connecting said contact member to said bond pad of said semiconductor die;
    bringing together said surface of said semiconductor die and said connection surface of said interconnect having said contact member aligned proximate said bond pad on said surface of said semiconductor die;
    engaging said semiconductor die and said interconnect by applying a force; and
    substantially ultrasonically vibrating one of said semiconductor die and said interconnect using vibrational energy having said contact member of said interconnect penetrating a portion of said bond pad of said semiconductor die, forming an electrical connection.

12. The method of claim 11, whereby said engaging and said substantially ultrasonically vibrating are continued having said contact member penetrating said portion of said bond pad to a predetermined depth.

13. The method of claim 12, wherein said predetermined depth comprises a range of about 0.3–0.8 of a thickness of said bond pad.

14. The method of claim 12, wherein said substantially ultrasonically vibrating is conducted to achieve a vibrational amplitude in a range of about 5 to about 30 percent of said predetermined depth.

15. The method of claim 11, wherein said substantially ultrasonically vibrating is conducted in a range of about 5 to about 200 milliseconds.

16. The method of claim 12, further comprising:
    detecting penetration of said bond pad to said predetermined depth by detection/feedback apparatus.

17. The method of claim 16, further comprising:
    terminating said penetration of said bond pad on said surface of said semiconductor die by detecting said penetration of said bond pad to said predetermined depth by said detection/feedback apparatus.

18. The method of claim 11, wherein said electrical connection comprises a non-permanent electrical connection between said bond pad and said contact member.

19. The method of claim 11, wherein said electrical connection comprises a permanent electrical connection between said bond pad and said contact member.

20. The method of claim 11, further comprising:
retracting said semiconductor die and said interconnect from each other during application of a linear axial ultrasonic vibrational force to one of said semiconductor die and said interconnect, said retracting for disconnecting said semiconductor die from said interconnect.

* * * * *